United States Patent
Chen

(10) Patent No.: US 8,593,585 B2
(45) Date of Patent: Nov. 26, 2013

(54) LIGHT BAR FIXING STRUCTURE OF BACKLIGHT MODULE

(75) Inventor: Yung-Chien Chen, Taoyuan (TW)

(73) Assignee: CPT Technology (Group) Co., Ltd., Fuzhou (CN)

( * ) Notice: Subject to any disclaimer, the term of this patent is extended or adjusted under 35 U.S.C. 154(b) by 367 days.

(21) Appl. No.: 12/917,921

(22) Filed: Nov. 2, 2010

(65) Prior Publication Data

US 2012/0013820 A1 Jan. 19, 2012

(30) Foreign Application Priority Data

Jul. 14, 2010 (TW) ................................ 99213421 U

(51) Int. Cl.
*G02F 1/1333* (2006.01)
*G02F 1/1335* (2006.01)
*F21V 7/04* (2006.01)

(52) U.S. Cl.
USPC ............... 349/58; 349/65; 362/612; 362/613

(58) Field of Classification Search
USPC .................................................... 349/58, 65
See application file for complete search history.

(56) References Cited

U.S. PATENT DOCUMENTS

| 7,940,353 | B2* | 5/2011 | Tanaka | 349/65 |
| 8,033,708 | B2* | 10/2011 | Tsubaki | 362/612 |
| 8,197,081 | B2* | 6/2012 | Cho et al. | 362/97.1 |
| 2006/0087601 | A1* | 4/2006 | Lee | 349/60 |
| 2007/0165421 | A1* | 7/2007 | Sakai et al. | 362/612 |
| 2008/0074853 | A1* | 3/2008 | Jang et al. | 361/749 |
| 2008/0074902 | A1* | 3/2008 | Oh et al. | 362/612 |
| 2008/0122874 | A1* | 5/2008 | Han et al. | 345/690 |
| 2008/0204623 | A1* | 8/2008 | Tanaka | 349/58 |

FOREIGN PATENT DOCUMENTS

TW M350731 2/2009

\* cited by examiner

*Primary Examiner* — Edward Glick
*Assistant Examiner* — Dennis Y Kim
(74) *Attorney, Agent, or Firm* — WPAT, PC; Justin King

(57) ABSTRACT

A light bar fixing structure of a backlight module includes a reverse U-shaped frame, a light bar structure, and a fixing plate. The reverse U-shaped frame, which has an opening and multiple slits therein, is disposed on a back cover of the backlight module. The light bar structure includes a substrate and a plurality of light emitting devices. The fixing plate is attached to the substrate by using an adhesive layer. In addition, a plurality of buckling portions is provided in a periphery of the fixing plate, and by engaging the buckling portions with the slits, the fixing plate is fixed on the reverse U-shaped frame, which makes the light bar structure protrude from the opening of the reverse U-shaped frame after inserting through the opening. Therefore, regardless of light emitting device thickness, the light bar structure can be, in this manner, fixed on the back cover.

9 Claims, 3 Drawing Sheets

LIGHT BAR FIXING STRUCTURE OF BACKLIGHT MODULE

CROSS-REFERENCE TO RELATED APPLICATION

This application claims the benefit of Taiwan Patent Application No. 099213421, filed on Jul. 14, 2010, which is hereby incorporated by reference for all purposes as if fully set forth herein.

BACKGROUND OF THE INVENTION

1. Field of the Invention

The present invention relates to a light bar fixing structure of a backlight module, and more particularly to a light bar fixing structure which can be assembled into a backlight module from a bottom side of the backlight module.

2. Related Art

A backlight module is one of the key components of a liquid crystal display (LCD). The LCD panel itself is unable to emit light, such that the backlight module is adopted to supply sufficient and uniformly distributed light source for enabling the LCD display images. The LCD is widely used in electronic devices with high demand potential, such as, monitors, notebook PC, digital cameras, and projectors, thus driving the continuous growth on the demands of the backlight module and relevant components. Light emitting diodes (LEDs) are advantageous in small volume, long life-span, low power consumption, short response time, and strong shock resistance, so the LEDs are widely applied to illumination or backlight sources, and replace conventional light source elements, such as, conventional tungsten lamp bulbs, fluorescent lamp tubes, or cold cathode tubes.

Conventionally, in Taiwan, R.O.C. Utility Model Patent Number M366096, a side-edge backlight module is provided, which includes a frame, a light bar, and a back cover. The frame includes a side bar, a first extending portion, and at least one positioning slot disposed in the first extending portion. The light bar includes a substrate, a plurality of light emitting elements, and at least one positioning lug disposed in one side of the substrate, wherein the light bar is fixed in the side-edge backlight module by mounting the positioning lug into the positioning slot.

SUMMARY OF THE INVENTION

The present invention is directed to a light bar fixing structure of a backlight module, wherein the light bar structure is inserted from a bottom side of the backlight module by using a fixing plate and then protruded from an opening of a reverse U-shaped frame, so as to fix the light bar structure in the backlight module.

In the present invention, a light bar fixing structure of a backlight module includes: a reverse U-shaped frame, a light bar structure, and a fixing plate. The reverse U-shaped frame is disposed on a back cover of the backlight module and is provided with an opening and multiple slits therein; the light bar structure includes a substrate and a plurality of light-emitting devices; and the fixing plate is attached to the substrate of the light bar structure by using an adhesive layer, and the periphery of the fixing plate is provided with multiple buckling portions, such that the buckling portions can be engaged with the slits to firmly secure the fixing plate with the reverse U-shaped frame, which makes the light bar structure protrude from the opening of the reverse U-shaped frame after the light bar structure is inserted into the opening.

In one embodiment, the light bar fixing structure is applied to a liquid crystal display using a Color Sequential Display (CSD) method.

In one embodiment, the light emitting devices include at least one red LED, at least one green LED, and at least one blue LED, and the red LED, the green LED, and the blue LED are arranged in the light bar structure in a linear manner; in addition, the red LED, the green LED, and the blue LED are sequencely arranged according to different color sequential display (CSD) methods, and also the light emitting devices are embedded into the substrate of the light bar structure.

In one embodiment, the fixing plate further includes an extending portion, and the extending portion is fixed onto the other end surface of the reverse U-shaped frame by passing through the opening of the reverse U-shaped frame, such that the fixing plate is fixed on the reverse U-shaped frame in a form of a Z shape.

In one embodiment, the reverse U-shaped frame further includes a light guide plate and a reflecting sheet. The light guide plate is used for suppressing the substrate of the light bar structure and the reflecting sheet is disposed between the substrate and the light guide plate to reflect a light irradiated from the light emitting devices 122 for enhancing the luminance of the backlight module.

In the present invention, the light bar fixing structure is assembled into a backlight module from the bottom side of the backlight module, such that no matter if the light emitting devices are thick or thin, the light bar structure can be inserted into the opening of the reverse U-shaped frame from a rear end of the reverse U-shaped frame by using the fixing plate, thereby improving the convenience of replacing the light bar structure, and solving the problem, resulting from the different thickness of the light emitting devices, which causes that the light emitting devices cannot be assembled from a front side of the reverse U-shaped frame.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

In order to make the aforementioned and other objectives, features and advantages of the present invention comprehensible, preferred embodiments accompanied with figures are described in detail below.

Figure 1:
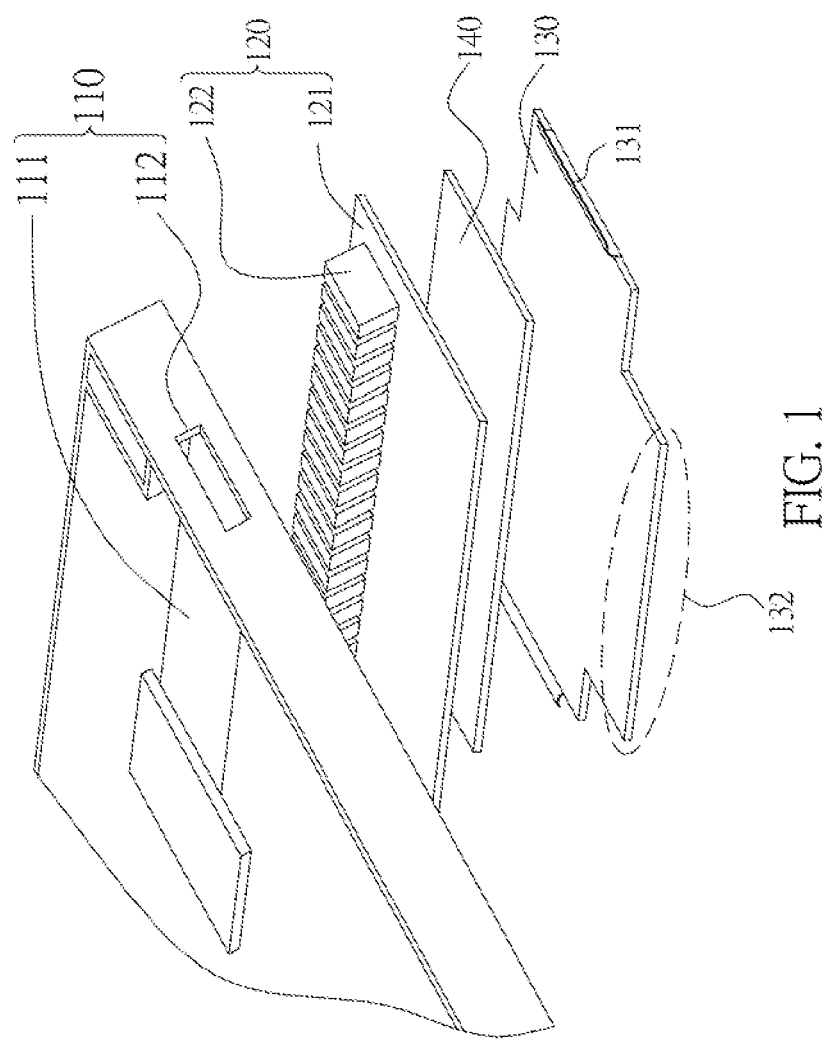
FIG. 1 is an exploded structural view of the present invention.

FIG. 1 is an exploded structural view of the present invention. Referring to FIG. 1, a light bar fixing structure of a backlight module includes a reverse U-shaped frame 110, a light bar structure 120, and a fixing plate 130. The reverse U-shaped frame 110 is disposed on a back cover of the backlight module, and has an opening 111 and a plurality of slits 112 disposed therein. The light bar structure 120 includes a substrate 121 and a plurality of light emitting devices 122. The fixing plate 130 is attached to the substrate 121 of the light bar structure 120 by using an adhesive layer 140, a plurality of buckling portions 131 is provided in the periphery of the fixing plate 130, and the buckling portions 131 are engaged with the slits 112, so as to firmly secure the fixing plate 130 with the reverse U-shaped frame 110, which makes the light bar structure 120 protrude from the opening of the reverse U-shaped frame 110 after inserting through the opening 111 of the reverse U-shaped frame 110.

In this embodiment, the light bar fixing structure of the backlight module is applied to an LCD adopting a Color Sequential Display (CSD) method.

In the embodiment, the light emitting device 122 includes at least one red LED, at least one green LED, and at least one blue LED. The red LED, the green LED, and the blue LED are disposed in the light bar structure 120 in a linear manner. The red LED, the green LED, and the blue LED are sequencely arranged according to different CSD methods. In addition, the light emitting devices 122 are embedded into the substrate 121 of the light bar structure 120.

In the embodiment, the fixing plate 130 further has an extending portion 132, and the extending portion 132 can be fixed onto the other end surface of the reverse U-shaped frame 110 by passing through the opening 111 of the reverse U-shaped frame 110, such that the fixing plate 130 is fixed on the reverse U-shaped frame 110 in the form of a Z shape.

In the embodiment, the light bar fixing structure of the backlight module further includes a light guide plate and a reflecting sheet. The light guide plate is used to suppress the substrate 121 of the light bar structure 120. The reflecting sheet is disposed between the substrate 121 and the light guide plate, so as to reflect a light source of the light emitting devices 122 to enhance the luminance of the backlight module.

Figure 2:
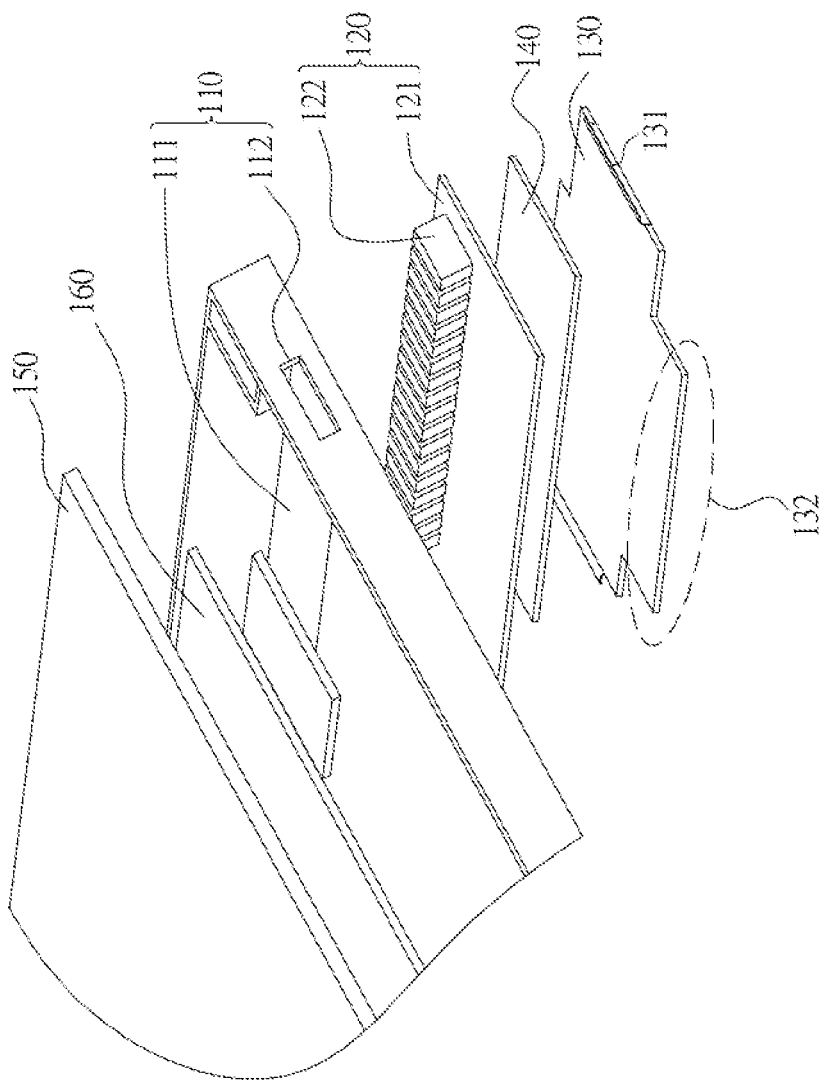
FIG. 2 is an exploded structural view of an embodiment of the present invention.
Figure 3:
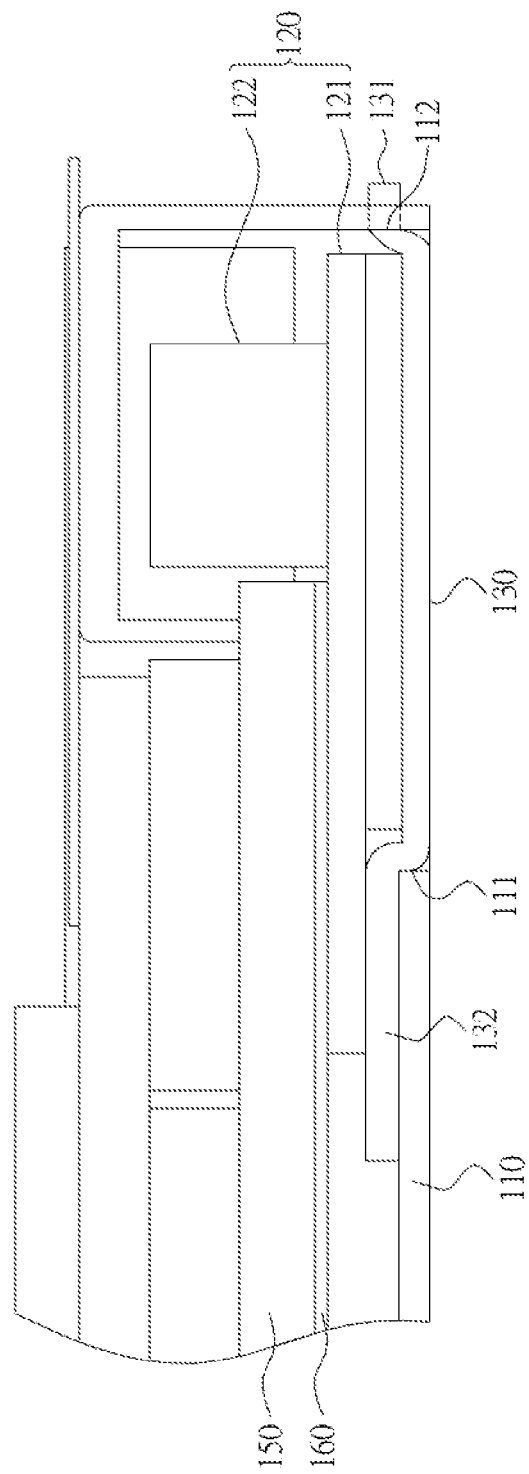
FIG. 3 is a sectional view after the structure of FIG. 2 is assembled.

FIG. 2 is an exploded structural view of an embodiment of the present invention, and FIG. 3 is a sectional view after the structure of FIG. 2 is assembled. Referring to FIGS. 2 and 3, schematic views of a preferred embodiment of the present invention are shown. In the drawings, the light bar fixing structure includes a reverse U-shaped frame 110, a light bar structure 120, a fixing plate 130, an adhesive layer 140, a light guide plate 150, and a reflecting sheet 160.

Further, the reverse U-shaped frame 110 is disposed on the rear end of the backlight module, such that generally the light emitting devices are inserted into the reverse U-shaped frame 110 from a front side of the backlight module. However, the thickness of the LEDs adopting the CSD method with three primary red, green, and blue (RGB) colors is thicker than the thickness of a white LED, such that when the LEDs adopting the CSD method with three primary RGB colors is assembled into the backlight module, it is difficult to directly insert the LEDs into the reverse U-shaped frame 110 for positioning.

Therefore, in the present invention, an opening 111 and a plurality of slits 112 are provided in the reverse U-shaped frame 110, and the slits 112 are disposed in the reverse U-shaped frame 110 surrounding the opening 111.

The light bar structure 120 includes a substrate 121 and a plurality of light emitting devices 122. Preferably, the light emitting devices 122 include at least one white LED, at least one red LED, at least one green LED, and at least one blue LED. The white LED, the red LED, the green LED, and the blue LED are disposed in the light bar structure 120 in a linear manner. The white LED, the red LED, the green LED, and the blue LED may be sequencely arranged according to different CSD methods, for example, red, green, blue, and green (RGBG) or red, white, blue, and white (RWBW), so as to change the arrangement sequences. In addition, the LEDs are embedded into the substrate 121 of the light bar structure 120.

Between the light bar structure 120 and the fixing plate 130, the substrate 121 of the light bar structure 120 is adhered to the fixing plate 130 by using an adhesive layer 140. A plurality of buckling portions 131 is provided in the periphery of the fixing plate 130 corresponding to the slits 112 of the reverse U-shaped frame 110, and the buckling portions 131 are engaged with the slits 112, so as to fix the fixing plate 130 on the reverse U-shaped frame 110. The fixing plate 130 has an extending portion 132, and the extending portion 132 may pass through the opening 111 of the reverse U-shaped frame 110 and then is fixed onto the other end surface of the reverse U-shaped frame 110. Therefore, the fixing plate 130 and the reverse U-shaped frame 110 are firmly secured to each other in the form of a Z shape, which makes the light bar structure 120 protrude from the reverse U-shaped frame 110 after inserting through the opening 111 of the reverse U-shaped frame 110.

In addition, the light guide plate 150 is used to suppress the substrate 121 of the light bar structure 120. The reflecting sheet 160 is disposed between the substrate 121 and the light guide plate 150, so as to reflect the light source of the light emitting device 122 to enhance the luminance of the backlight module.

To sum up, the light bar fixing structure of the backlight module according to the present invention has the following advantages.

1. Through the manner described above, the light bar structure 120 can be easily replaced; therefore, the problem of difficult to directly insert the LEDs into the reverse U-shaped frame for positioning when the LEDs adopting the CSD method with three primary RGB colors is assembled to the backlight module due to that the thickness of the LEDs adopting the CSD method with three primary RGB colors is thicker than that of a white LED can be overcome.

2. The white LED, the red LED, the green LED, and the blue LED on the light bar structure are sequencely arranged according to different CSD methods, for example, the arrangement sequence may be RGBG or RWBW.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A light bar fixing structure of a backlight module, comprising:
 a frame, which is disposed on a back cover of the backlight module, wherein the frame includes a bottom plate and multiple sidewalls, the bottom plate is provided with an opening therein, and the sidewalls are provided with multiple slits therein;
 a light bar structure comprising a substrate and a plurality of light-emitting devices; and
 a fixing plate, which is attached to the substrate of the light bar structure, and a periphery of the fixing plate is provided with multiple buckling portions, such that the buckling portions can be engaged with the slits to firmly secure the fixing plate with the frame, which makes the light bar structure protrude from the opening of the bottom plate of the frame after the light bar structure and the fixing plate is inserted into the opening of the bottom plate of the frame from a bottom side of the backlight module;
 wherein the fixing plate further comprises an extending portion, and the extending portion is fixed onto an end surface of the frame by passing through the opening of the frame.

2. The light bar fixing structure of a backlight module as claimed in claim 1, the light bar fixing structure is applied to a liquid crystal display using a Color Sequential Display (CSD) method.

3. The light bar fixing structure of a backlight module as claimed in claim 1, wherein the light emitting devices comprise at least one red LED, at least one green LED, and at least one blue LED.

4. The light bar fixing structure of a backlight module as claimed in claim 3, wherein the red LED, the green LED, and the blue LED are arranged in the light bar structure in a linear manner.

5. The light bar fixing structure of a backlight module as claimed in claim 3, wherein the red LED, the green LED, and the blue LED are sequentially arranged.

6. The light bar fixing structure of a backlight module as claimed in claim 1, wherein the light emitting devices are embedded into the substrate of the light bar structure.

7. The light bar fixing structure of a backlight module as claimed in claim 1, wherein the fixing plate has a bent shape, whereby the fixing plate is fixed on the frame in a form of a Z shape.

8. The light bar fixing structure of a backlight module as claimed in claim 1, wherein the frame further comprises a light guide plate for pressing the substrate of the light bar structure.

9. The light bar fixing structure of a backlight module as claimed in claim 8, wherein the frame further comprises a reflecting sheet disposed between the substrate and the light guide plate to reflect a light irradiated from the light emitting devices for enhancing brightness of the backlight module.

* * * * *